United States Patent
Shamoto et al.

(10) Patent No.: US 6,690,322 B2
(45) Date of Patent: Feb. 10, 2004

(54) WIRELESS COMMUNICATIONS TERMINAL, COMPUTER PROGRAM EXECUTABLE BY WIRELESS COMMUNICATIONS TERMINAL AND METHOD FOR OUTPUTTING POSITIONAL INFORMATION FROM WIRELESS COMMUNICATIONS TERMINAL

(75) Inventors: Michio Shamoto, Niwa-gun (JP); Hiroyasu Ogino, Okazaki (JP); Kyoji Oda, Gamagori (JP); Toshihiro Takeuchi, Tokoname (JP); Atsushi Hayashida, Kariya (JP); Tatsuya Shintai, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/227,264

(22) Filed: Aug. 26, 2002

(65) Prior Publication Data

US 2003/0043069 A1 Mar. 6, 2003

(30) Foreign Application Priority Data

Aug. 30, 2001 (JP) .......................................... 2001-261423

(51) Int. Cl.[7] ................................................. G01S 5/14
(52) U.S. Cl. .................................... 342/357.1; 342/464
(58) Field of Search ........................ 342/357.1, 357.09, 342/357.14, 464, 457

(56) References Cited

U.S. PATENT DOCUMENTS

| | | | | |
|---|---|---|---|---|
| 5,604,765 A | * | 2/1997 | Bruno et al. | ................. 375/141 |
| 5,646,630 A | * | 7/1997 | Sheynblat et al. | ..... 342/357.14 |
| 5,936,572 A | * | 8/1999 | Loomis et al. | .............. 342/457 |
| 5,999,126 A | * | 12/1999 | Ito | ........................ 342/357.1 |
| 6,236,359 B1 | * | 5/2001 | Watters et al. | ........... 342/357.1 |

FOREIGN PATENT DOCUMENTS

| | | | | |
|---|---|---|---|---|
| JP | A 4-95888 | 3/1992 | | |
| JP | A 10-213644 | 8/1998 | | |
| WO | WO 00/75682 A1 | * | 12/2000 | ............. G01S/5/14 |
| WO | WO 01/58194 A1 | * | 9/2001 | ............. H04Q/7/36 |

* cited by examiner

Primary Examiner—Gregory C. Issing
(74) Attorney, Agent, or Firm—Oliff & Berridge, PLC

(57) ABSTRACT

A cellular phone receives a position measurement result, which indicates a position of the cellular phone determined based on both GPS satellite information and CDMA base station information, from a location information server. Then, when a value indicated by uncertainty information of the position measurement result is greater than a first threshold value, the cellular phone receives another position measurement result, which indicates the position of the cellular phone determined based only on the CDMA base station information, from the location information server and displays it on a display device.

16 Claims, 6 Drawing Sheets

WIRELESS COMMUNICATIONS TERMINAL, COMPUTER PROGRAM EXECUTABLE BY WIRELESS COMMUNICATIONS TERMINAL AND METHOD FOR OUTPUTTING POSITIONAL INFORMATION FROM WIRELESS COMMUNICATIONS TERMINAL

CROSS REFERENCE TO RELATED APPLICATION

This application is based on and incorporates herein by reference Japanese Patent Application No. 2001-261423 filed on Aug. 30, 2001.

BACKGROUND OF THE INVENTION

1. Field of the Invention

The present invention relates to a wireless communications terminal, which receives a position measurement result that indicates a position of the wireless communications terminal from an external location information server and outputs the received position measurement result. The present invention also relates to a computer program executable by the wireless communications terminal and also to a method for outputting the position measurement result from the wireless communications terminal as positional information of the wireless communications terminal.

2. Description of Related Art

For example, some of location systems use global positioning system (GPS) satellites and/or code division multiple access (CDMA) base stations to determine a position of a wireless communications terminal, such as a cellular phone. When the cellular phone receives a command from a user to initiate a position measurement operation for determining a position of the cellular phone, the cellular phone searches the corresponding CDMA base stations and obtains CDMA base station information about the searched CDMA base stations. Then, the cellular phone transmits the CDMA base station information and a request for transmitting assist information, which is useful to the cellular phone in searching of the GPS satellites, to the location information server.

When the location information server receives the CDMA base station information and the request for transmitting the assist information from the cellular phone, the location information server determines an approximate position of the cellular phone based on the CDMA base station information received from the cellular phone. Then, the location information server computes the assist information, which is useful to the cellular phone in searching of the GPS satellites, based on the approximate position of the cellular phone. Thereafter, the location information server transmits the assist information to the cellular phone. When the cellular phone receives the assist information from the location information server, the cellular phone searches for the corresponding GPS satellites based on the assist information. Next, the cellular phone obtains GPS satellite information about the searched GPS satellites. Thereafter, the cellular phone transmits the GPS satellite information and a request for transmitting a position measurement result to the location information server.

Then, when the location information server receives the GPS satellite information and the request for transmitting the position measurement result from the cellular phone, the location information server determines the position of the cellular phone based on the GPS satellite information and/or the CDMA base station information. Thereafter, the location information server transmits a corresponding position measurement result, which indicates the determined position of the cellular phone, to the cellular phone.

In this way, the cellular phone searches the GPS satellites based on the assist information received from the location information server, so that the time required for determining the position of the cellular phone can be advantageously reduced. Furthermore, the position of the cellular phone is not determined by the cellular phone itself but is determined by the location information server, so that the work load of the cellular phone can be advantageously reduced, and the power consumption of the cellular phone can be also advantageously reduced.

However, when the cellular phone is located in an area near a window in a room, it is difficult to search GPS satellites, which are located at relatively high altitudes with respect to the cellular phone and thus have relatively large angles of elevation with respect to the cellular phone. As a result, the cellular phone can only search GPS satellites, which are located at relatively low altitudes with respect to the cellular phone and thus have relatively small angles of elevation with respect to the cellular phone. Therefore, the cellular phone only searches the GPS satellites, which are located at relatively low altitudes, and only obtains the GPS satellite information of these GPS satellites. Then, the obtained GPS satellite information is transmitted to the location information server. Consequently, the accuracy of the position measurement result is substantially, disadvantageously reduced.

Furthermore, when the cellular phone is located, for example, in a valley between tall buildings, the cellular phone receives not only direct waves (i.e., primary waves), which are directly transmitted from the CDMA base stations, but also reflected waves, which are transmitted from the CDMA base stations and are reflected, for example, by buildings. Thus, in such a case, when the cellular phone receives the reflected waves, the cellular phone obtains erroneous information about the CDMA base stations and transmits the erroneous information to the location information server. As a result, in this case too, the accuracy of the position measurement result is substantially, disadvantageously reduced. That is, the cellular phone can only provide the position measurement result having the relatively low accuracy, and the convenience of the cellular phone is impaired accordingly.

SUMMARY OF THE INVENTION

The present invention addresses the above disadvantage. Thus, it is an objective of the present invention to provide a wireless communications terminal, which is capable of providing a more appropriate position measurement result. It is another objective of the present invention to provide a computer program executable by such a wireless communications terminal to provide a more appropriate position measurement result. It is a further objective of the present invention to provide a method for outputting a more appropriate position measurement result from such a wireless communications terminal.

To achieve the objectives of the present invention, there is provided a wireless communications terminal including a plurality of searching means, each for searching at least one corresponding external signal source, which outputs a signal usable in determining a position of the wireless communications terminal, and for outputting search information about the at least one corresponding external signal source, which is obtained through the searching of the at least one corresponding external signal source. The plurality of searching means includes a first searching means for searching at least one GPS satellite as the at least one corresponding external signal source and a second searching means for searching at least one base station as the at least one corresponding external signal source. The wireless communications terminal further includes a wireless telephone transceiver means for performing wireless telephone communication with a corresponding one of the at least one base station, an outputting means for outputting positional information of the wireless communications system, and a control means for controlling the plurality of searching means, the wireless telephone transceiver means and the outputting means. The control means receives each search information from each searching means and transmits each search information to an external location information server through the wireless telephone transceiver means. The external location information server is capable of generating a plurality of position measurement results, each of which indicates the position of the wireless communications terminal, based on the search information of at least one of the plurality of searching means and is also capable of transmitting each of the position measurement results. The control means receives a first one of the position measurement results, which is transmitted from the external location information server, through the wireless telephone transceiver means and determines whether a predetermined condition is satisfied. When the control means determines that the predetermined condition is satisfied, the control means receives a second one of the position measurement results, which is transmitted from the external location information server, through the wireless telephone transceiver means and outputs the second one of the position measurement results to the outputting means, so that the outputting means outputs the second one of the position measurement results as the positional information of the wireless communications terminal.

To achieve the objectives of the present invention, there is also provided a computer program executable by the wireless communications terminal and a method for outputting positional information from the wireless communications terminal. First, in the wireless communications terminal, search information is received from each of a plurality of searching means, each for searching at least one corresponding external signal source, which outputs a signal usable in determining a position of the wireless communications terminal, and for outputting the search information about the at least one corresponding external signal source, which is obtained through the searching of the at least one corresponding external signal source. The plurality of searching means includes a first searching means for searching at least one GPS satellite as the at least one corresponding external signal source and a second searching means for searching at least one base station as the at least one corresponding external signal source. Then, the search information of each of the plurality of searching means is transmitted to an external location information server through a wireless telephone transceiver means for performing wireless telephone communication with a corresponding one of the at least one base station. Thereafter, a first one of a plurality of position measurement results, each of which indicates the position of the wireless communications terminal, is received from the external location information server through the wireless telephone transceiver means. The position measurement results are generated by the external location information server based on the search information of at least one of the plurality of searching means. Then, it is determined whether a predetermined condition is satisfied. Next, a second one of the position measurement results is received from the external location information server through the wireless telephone transceiver means when it is determined that the predetermined condition is satisfied. Then, the second one of the position measurement results is inputted to an outputting means for outputting positional information of the wireless communications system, so that the outputting means outputs the second one of the position measurement results as the positional information of the wireless communications terminal.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A cellular phone, which acts as a wireless communications terminal of the present invention, according to an embodiment of the present invention will be described with reference to the accompanying drawings.

Figure 1:
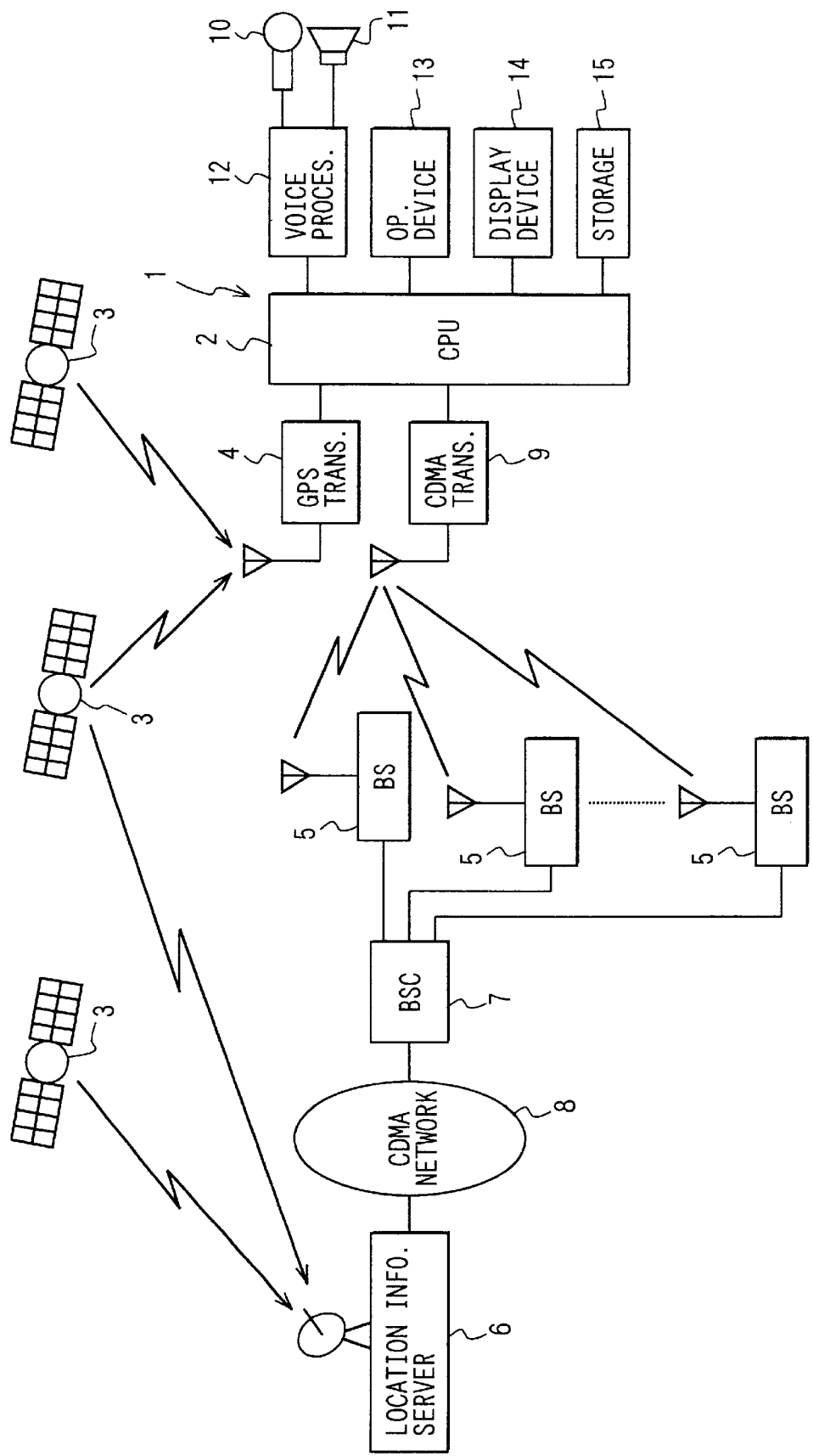
FIG. 1 is a schematic view showing functional blocks of a cellular phone and related devices according to an embodiment of the present invention.

FIG. 1 is a schematic view showing functional blocks of the cellular phone and other related devices. The cellular phone 1 includes a central processing unit (CPU) 2, which acts as a control means of the present invention and includes a microcomputer. In the cellular phone 1, the CPU 2 is connected to a global positioning system (GPS) transceiver (acting as a first searching means of the present invention) 4, a code division multiple access (CDMA) transceiver (acting as a second searching means and a wireless telephone transceiver means of the present invention) 9, a voice processor 12, an operating device (acting as an operating means of the present invention), a display device 14 (acting as an outputting means of the present invention) and a storage 15. The GPS transceiver 4 searches GPS satellites 3. The CDMA transceiver 9 searches CDMA base stations (CDMA BS's) 5 and communicates information with a location information server (or simply referred to as a location server) 6 through the corresponding CDMA base station 5, a base station controller (BSC) 7 and a CDMA telephone network 8. The voice processor 12 processes outgoing voice inputted through a microphone 10 and incoming voice to be outputted from a speaker 11. The operating device 13 includes a keypad. The keypad includes a communication initiation key, a communication termination key, numeral keys (i.e., 0 to 9 keys) and the like. The display device 14 includes a liquid crystal display device for displaying various information, such as date and time, telephone numbers and others. The storage 15 includes, for example, a random access memory (RAM) or a read only memory (ROM). The operating device 13 can be a touch panel type operating device displayed on the display device 14. Furthermore, the GPS transceiver 4 and the CDMA transceiver 9 can share a common antenna.

The cellular phone 1 obtains GPS satellite information through searching of the GPS satellites 3. Also, the cellular phone 1 obtains CDMA base station information through searching of the CDMA base stations 5. Then, the cellular phone 1 transmits the GPS satellite information and the CDMA base station information to the location information server 6 through the corresponding CDMA base station 5, the base station controller 7 and the CDMA telephone network 8. Then, when the location information server 6 receives the GPS satellite information and the CDMA base station information from the cellular phone 1, the location information server 6 determines a current position of the cellular phone 1 based on the GPS satellite information and the CDMA base station information and transmits a position measurement result, which indicates the determined position of the cellular phone 1, to the cellular phone 1 through the CDMA telephone network 8, the base station controller 7 and the corresponding CDMA base station 5.

Figure 2:
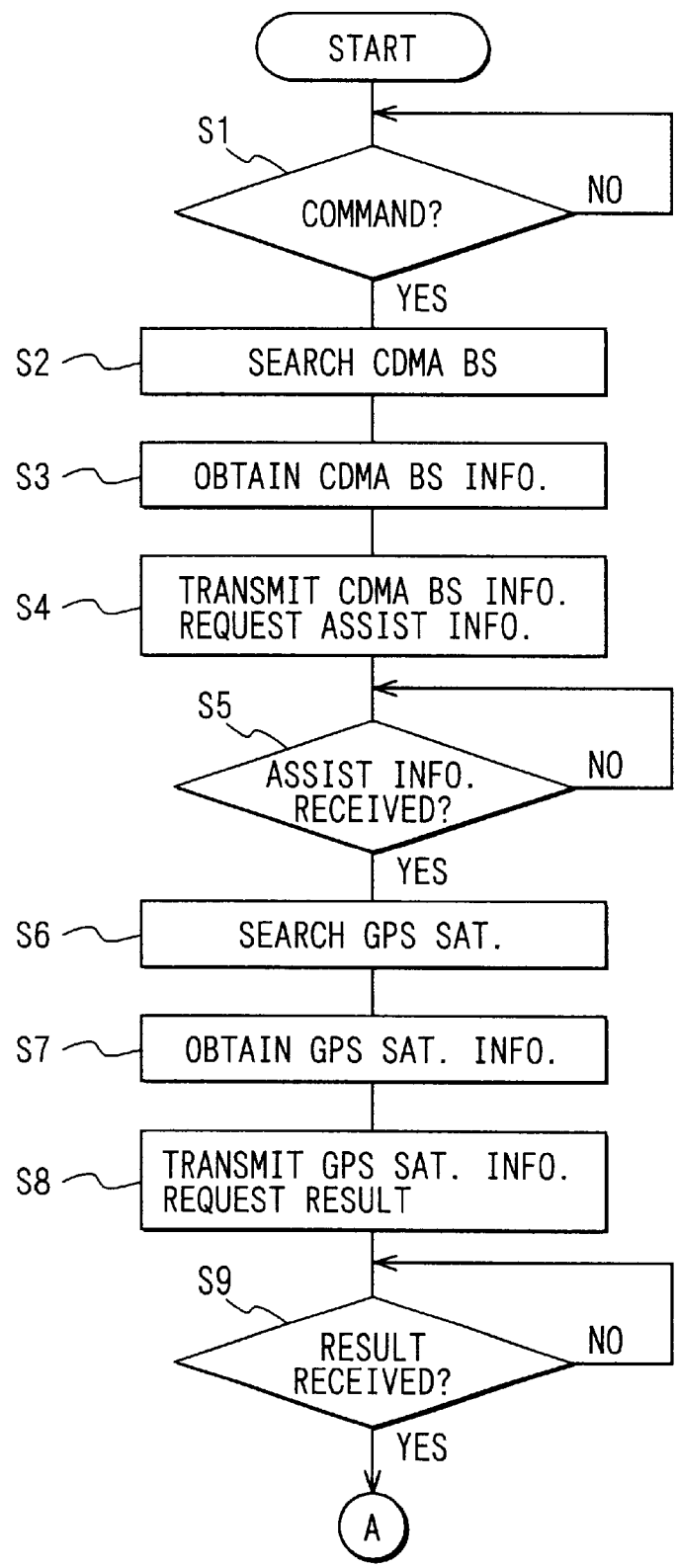
FIG. 2 is a flow chart showing a first part of an algorithm of a computer program executed in a CPU of the cellular phone.
Figure 3:
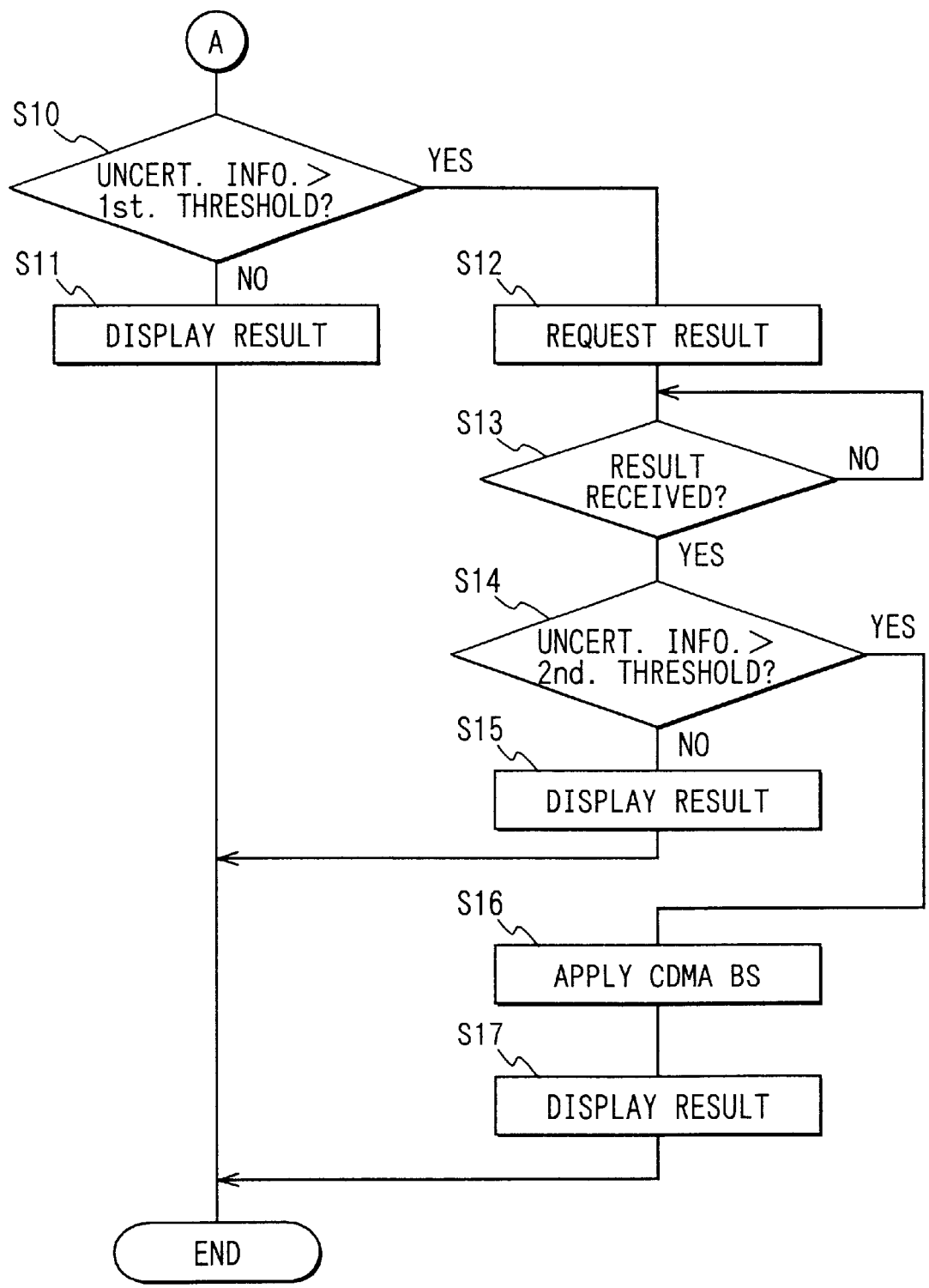
FIG. 3 is a flow chart showing a second part of the algorithm of the computer program executed in the CPU of the cellular phone.

Operation of the above arrangement will be described in greater detail with reference to FIGS. 2 to 6. FIGS. 2 and 3 schematically show a flowchart indicating an algorithm of a computer program executed by the CPU 2.

In the cellular phone 1, the CPU 2 determines whether a user has operated the operating device 13 to input a command for initiating a position measurement operation for determining the position of the cellular phone 1 at step S1. When YES is returned at step S1, the CPU 2 commands the CDMA transceiver 9 to search the corresponding CDMA base stations 5 at step S2 and obtains the CDMA base station information about the CDMA base stations 5 from the CDMA transceiver 9 at step S3. Then, the CPU 2 commands the CDMA transceiver 9 to transmit the obtained CDMA base station information and a request for transmitting assist information, which is useful to the GPS transceiver 4 of the cellular phone 1 in searching of the GPS satellites 3, to the location information server 6 through the CDMA transceiver 9 at step S4.

When the location information server 6 receives the CDMA base station information and the request for transmitting the assist information from the cellular phone 1, the location information server 6 determines an approximate position of the cellular phone 1 based on the CDMA base station information received from the cellular phone 1. Then, based on the approximate position of the cellular phone 1, the location information server 6 computes the assist information, which is useful to the cellular phone 1 in searching of the GPS satellites 3. Then, the location information server 6 transmits the computed assist information to the cellular phone 1.

In the cellular phone 1, the CPU 2 determines whether the assist information has been received from the location information server 6 through the CDMA transceiver 9 at step S5. When YES is returned at step S5, the CPU 2 commands the GPS transceiver 4 to search the corresponding GPS satellites 3 based on the received assist information at step S6 and obtains the GPS satellite information about the GPS satellites 3 at step S7. Then, the CPU 2 commands the CDMA transceiver 9 to transmit the obtained GPS satellite information and a request for transmitting a position measurement result to the location information server 6 at step S8. At this time, the CPU 2 specifies a condition for determination of the position of the cellular phone 1 in such a manner that the determination of the position of the cellular phone 1 is carried out based on both the GPS satellite information and the CDMA base station information in the location information server 6.

When the location information server 6 receives the GPS satellite information and the request for transmitting the position measurement result from the cellular phone 1, the location information server 6 recognizes the specified condition for determination of the position of the cellular phone 1, so that the location information server 6 determines the current position of the cellular phone 1 based on both the GPS satellite information and the CDMA base station information received from the cellular phone 1. Then, the location information server 6 generates and transmits the position measurement result, which indicates the determined position of the cellular phone 1, to the cellular phone 1. At this time, the location information server 6 also generates and transmits uncertainty information to the cellular phone 1 by including the uncertainty information in the position measurement result. The uncertainty information indicates an uncertainty level or an error of the position measurement result. When the error of the position measurement result is relatively large, the uncertainty information shows a relatively large value. On the other hand, when the error of the position measurement result is relatively small, the uncertainty information shows a relatively small value.

In the cellular phone 1, the CPU 2 determines whether the position measurement result has been received from the location information server 6 through the CDMA transceiver 9 at step S9. When YES is returned at step S9, the CPU 2 extracts the uncertainty information from the received position measurement result and compares the value (uncertainty level) indicated by the uncertainty information with a predetermined first threshold value at step S10. The first threshold value is freely selected by the user when the user performs a predetermined operation (corresponding to a predetermined first operation of the present invention).

Figure 4A:
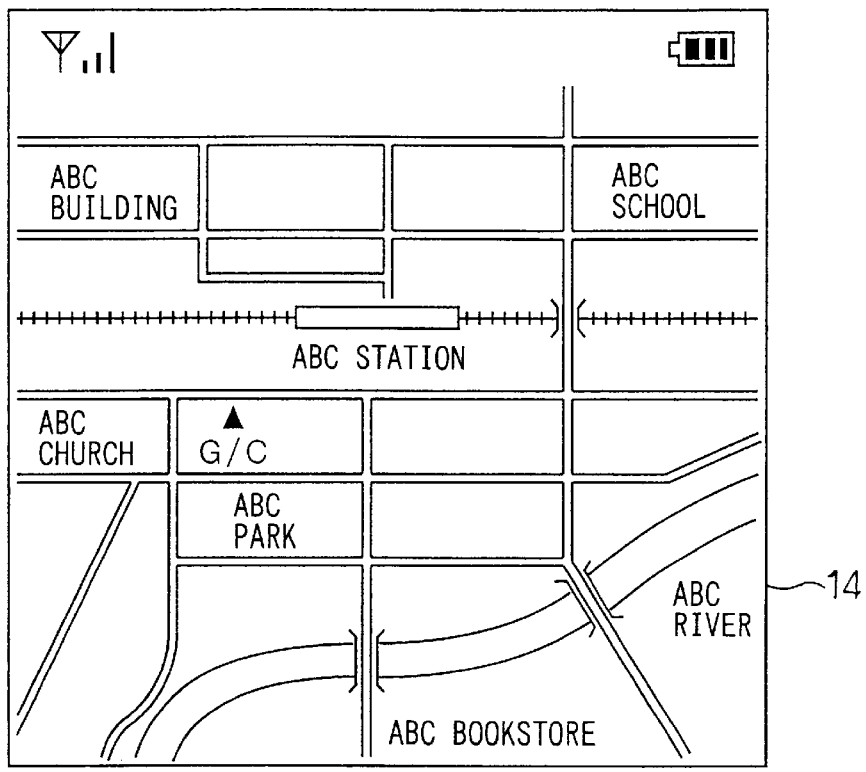
FIG. 4A is a schematic view showing an exemplary screen of a display device of the cellular phone with a position measurement result.

When the CPU 2 determines that the value indicated by the uncertainty information is not greater than the first threshold value, i.e., when the CPU 2 determines that the error of the position measurement result is relatively small (NO at step S10), the CPU 2 commands the display device 14 to display the received position measurement result at step S1, as shown in FIG. 4A. In FIG. 4A, the position (or position measurement result) of the cellular phone 1, which is determined based on both the GPS satellite information and the CDMA base station information in the above manner is indicated by "G/C" (first source indication of the present invention), so that the user can recognize the position of the cellular phone 1, which is determined based on both the GPS satellite information and the CDMA base station information.

When the CPU 2 determines that the value indicated by the uncertainty information is greater than the first threshold value, i.e., when the CPU 2 determines that the error of position measurement result is relatively large (YES at step S10), the CPU 2 requests transmission of another position measurement result to the location information server 6 at step S12. At this time, unlike the previous position determination where the GPS satellite information and the CDMA base station information are both used, the CPU 2 specifies the condition for determination of the position of the cellular phone 1 in such a manner that the position of the cellular phone 1 is determined based only on the CDMA base station information in the location information server 6.

When the location information server 6 receives the request for transmitting another position measurement result from the cellular phone 1, the location information server 6 recognizes the specified condition for determination of the position of the cellular phone 1, so that the location information server 6 determines the position of the cellular phone 1 based only on the CDAM base station information received from the cellular phone 1. Then, the location information server 6 transmits the position measurement result, which indicates the determined position of the cellular phone 1, to the cellular phone 1. At this time, the location information server 6 transmits the uncertainty information, which indicates the error of the position measurement result, to the cellular phone 1 by including the uncertainty information in the position measurement result.

In the cellular phone 1, when the CPU 2 determines that the position measurement result is received from the location information server 6 through the CDMA transceiver 9 (YES at step S13), the CPU 2 extracts the uncertainty information from the position measurement result received from the location information server 6 and compares the value indicated by the uncertainty information with a predetermined second threshold value at step S14. Similar to the first threshold value, the second threshold value is freely selected by the user when the user performs a predetermined operation (corresponding to the predetermined first operation of the present invention).

Figure 4B:
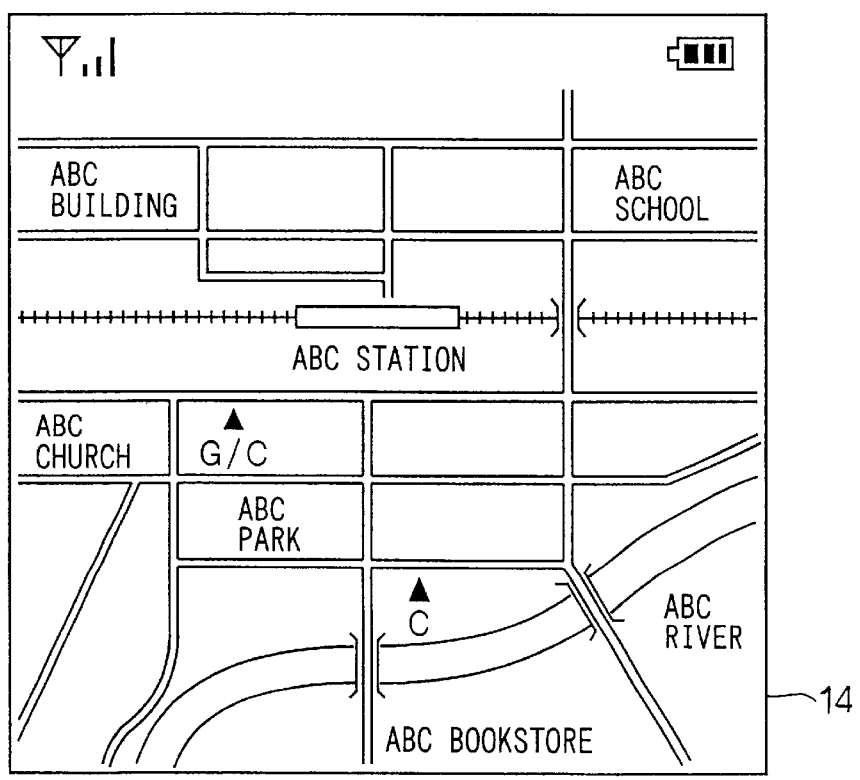
FIG. 4B is a schematic view similar to FIG. 4A showing another position measurement result.
Figure 5A:
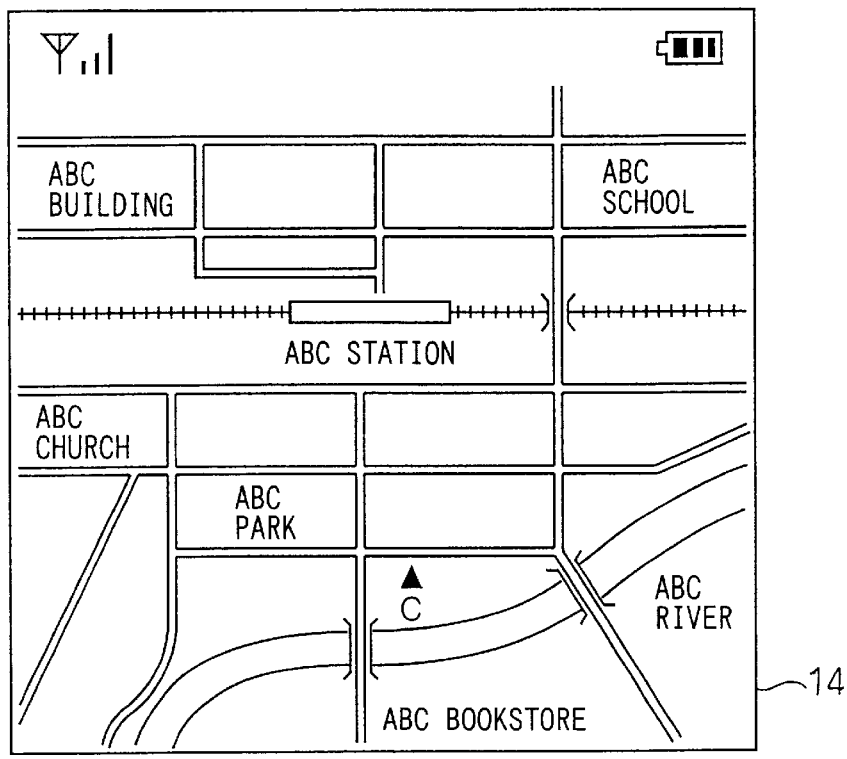
FIG. 5A is a schematic view similar to FIGS. 4A and 4B showing another position measurement result.

When the CPU 2 determines that the value indicated by the uncertainty information is not greater than the second threshold value (No at step S14), the CPU 2 commands the display device 14 to display the received position measurement result at step S15, as shown in FIG. 4B. In FIG. 4B, the current position of the cellular phone 1, which is determined based on both the GPS satellite information and the CDMA base station information, is indicated by "G/C", and the current position of the cellular phone 1, which is determined based only on the CDMA base station information, is indicated by "C" (second source indication of the present invention). Thus, the user can recognize both the current position of the cellular phone 1, which is determined based on both the GPS satellite information and the CDMA base station information, and the current position of the cellular phone 1, which is determined based only on the CDMA base station information. The user can compare these two positions. Furthermore, as shown in FIG. 5A, it is possible to eliminate the current position of the cellular phone 1, which is determined based on both the GPS satellite information and the CDMA base station information, from the screen of the display device 14 and thus to leave only the current position of the cellular phone 1, which is determined based only on the CDMA base station information, on the screen of the display device 14.

Figure 5B:
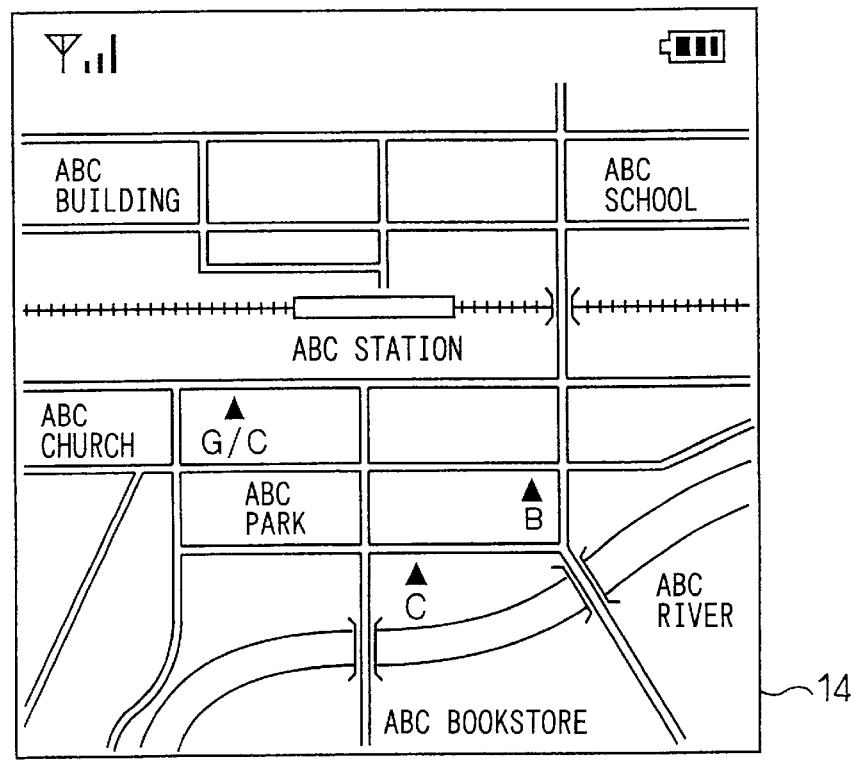
FIG. 5B is a schematic view similar to FIGS. 4A to 5A showing another position measurement result.

On the other hand, when the CPU 2 determines that the value indicated by the uncertainty information is greater than the second threshold value (YES at step S14), the CPU 2 applies the corresponding CDMA base station (communications base station), which currently communicates with the cellular phone 1, at step S16. Then, the CPU 2 commands the display device 14 to display a position of the recognized CDMA base station 5 on the screen of the display device 14 as the position measurement result at step S17, as shown in FIG. 5B. In FIG. 5B, the current position of the cellular phone 1, which is determined based on both the GPS satellite information and the CDMA base station information, is indicated by "G/C", and the current position of the cellular phone 1, which is determined based only on the CDMA base station information, is indicated by "C". Furthermore, in FIG. 5B, the position of the recognized CDMA base station 5, which currently communicates with the cellular phone 1, is indicated by "B" (third source indication of the present invention). As a result, the user can recognize the current position of the cellular phone 1, which is determined based on both the GPS satellite information and the CDMA base station information, the current position of the cellular phone 1, which is determined based only on the CDMA base station information, and the position of the corresponding CDMA base station 5, which currently communicates with the cellular phone 1. The user can compare these positions.

That is, in this case, although the position of the cellular phone 1 is determined by the location information server 6 based only on the CDMA base station information, the position of the corresponding CDMA base station 5, which currently communicates with the cellular phone 1, is displayed on the screen of the display device 14 when the value indicated by the uncertainty information is greater than the second threshold value, i.e., when the error of the position measurement result is relatively large. Furthermore, it is possible to eliminate the current position of the cellular phone 1, which is determined based on both the GPS satellite information and the CDMA base station information, and the current position of the cellular phone 1, which is determined based only on the CDMA base station information, from the screen of the display device 14 and thus to leave only the position of the corresponding CDMA base station 5, which currently communicates with the cellular phone 1, on the screen of the display device 14.

In the above description, there is described the arrangement for displaying the current position of the cellular phone 1, which is determined based on both the GPS satellite information and the CDMA base station information, the current position of the cellular phone 1, which is determined based only on the CDMA base station information, and the position of the corresponding CDMA base station 5, which currently communicates with the cellular phone 1. The above arrangement can be modified as follows. That is, the condition for determination of the position of the cellular phone 1 can be specified in such a manner that the current position of the cellular phone 1 is determined based only on the GPS satellite information in the location information server 6. Then, the current position of the cellular phone 1, which is determined based only on the GPS satellite information, can be displayed on the screen of the display device 14 together with an indication of "G" (second or fourth source indication of the present invention) in addition to or alternative to, for example, the position of the cellular phone 1 determined based only on the CDMA base station information.

Furthermore, in the above description, the way of determining the current position of the cellular phone 1 is automatically changed from one to the other by comparing the uncertainty information with the first or second threshold value. Alternatively, this can be modified such that the way of determining the current position of the cellular phone 1 can be changed from one to the other when the user performs a predetermined operation (corresponding to a predetermined second operation of the present invention) through the operating device 13.

Figure 6:
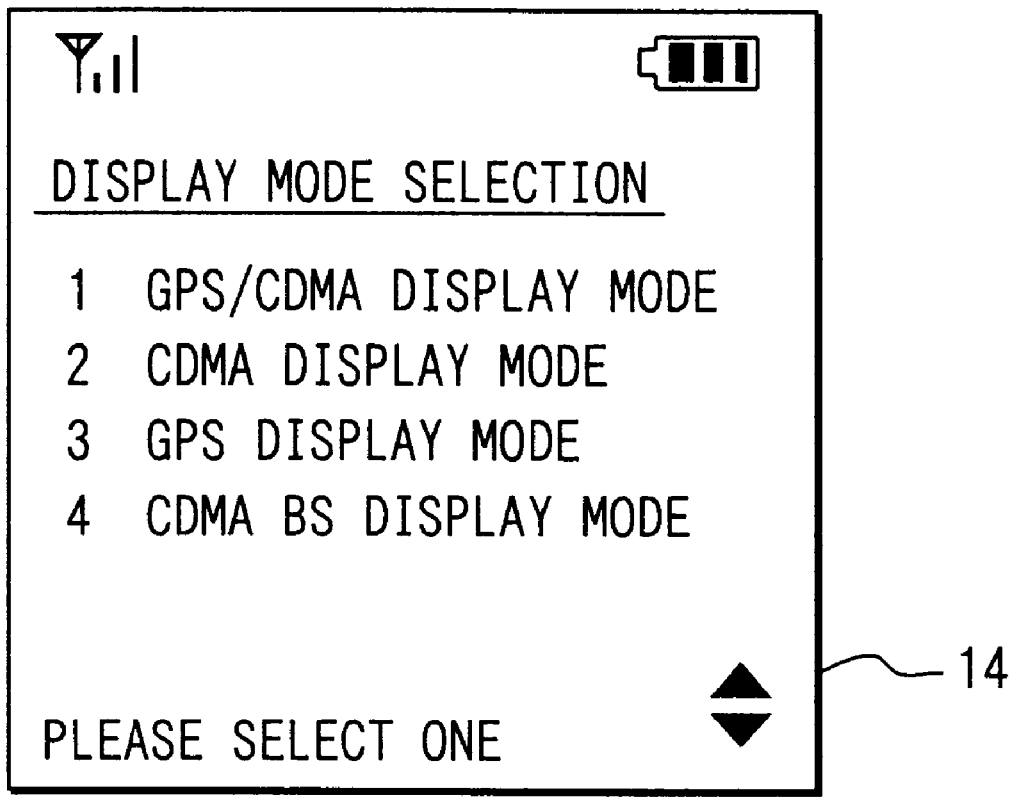
FIG. 6 is a schematic view showing an exemplary selection screen for selecting a display mode.

More specifically, as shown in FIG. 6, the screen of the display device 14 can be arranged to display a mode selection screen for selecting a display mode, so that the user can manually select the display mode from a GPS/CDMA display mode, a CDMA display mode, a GPS display mode and a CDMA base station display mode. Selection of each of the display modes causes display of a corresponding one of the position measurement results on the display device 14. For example, when the user commands to select the GPS/CDMA display mode, the condition for determination of the position is specified in such a manner that the location information server 6 determines the current position of the cellular phone 1 based on both the GPS satellite information and the CDMA base station information. Then, the position measurement result, which indicates the current position of the cellular phone determined based on both the GPS satellite information and the CDMA base station information, is received from the location information server 6 and is displayed on the screen of the display device 14. Furthermore, when the user commands to select the CDMA display mode, the condition for determination of the position of the cellular phone 1 is specified in such a manner that the location information server 6 determines the current position of the cellular phone 1 based only on the CDMA base station information. Then, the position measurement result, which indicates the current position of the cellular phone determined based only on the CDMA base station information, is received from the location information server 6 and is displayed on the screen of the display device 14.

Furthermore, when the user commands to select the GPS display mode, the condition for determination of the position of the cellular phone 1 is specified in such a manner that the location information server 6 determines the current position of the cellular phone 1 based only on the GPS satellite information. Then, the position measurement result, which indicates the current position of the cellular phone determined based only on the GPS satellite information, is received from the location information server 6 and is displayed on the screen of the display device 14. Also, when the user commands to select the CDMA base station display mode, the position of the corresponding CDMA base station 5, which currently communicates with the cellular phone 5, is displayed on the screen of the display device 14.

In this way, when the user is located in an unfavorable environment, such as an area near a window in a room or a valley between tall buildings, where search of the GPS satellites 3 or the CDMA base stations 5 is unfavorably influenced by the environmental factor(s), the user can manually change the way of determining the position of the cellular phone 1 from one to the other depending on the environment, so that the user can obtain and display the appropriate position measurement result on the display device 14 of the cellular phone 1.

According to the embodiment described above, after reception of the position measurement result, which indicates the current position of the cellular phone 1 determined, for example, based on both the GPS satellite information and the CDMA base station information, from the location information server 6, it is determined whether the value indicated by the uncertainty information is greater than the first threshold value in the cellular phone 1. When it is determined that the value indicated by the uncertainty information is greater than the first threshold value, the cellular phone 1 receives another position measurement result, which indicates the current position of the cellular phone 1 determined, for example, based only on the CDMA base station information, from the location information server 6, and then the cellular phone 1 displays the received position measurement result on the display device 14. Thus, even when the accuracy of the position measurement result, which indicates the current position of the cellular phone 1 determined based on both the GPS satellite information and the CDMA base station information, is relatively low, the position measurement result, which indicates the current position of the cellular phone 1 determined based only on the CDMA base station information with higher accuracy, can be received and displayed. Thus, the appropriate position measurement result can be provided to improve the convenience of the cellular phone 1.

Furthermore, when the value indicated by the uncertainty information is greater than the first threshold value, the other position measurement result, which indicates the current position of the cellular phone 1 determined, for example, based only on the CDMA base station information, can be received from the location information server 6 without performing another search for the CDMA base stations 5. Thus, the position measurement result, which indicates the current position of the cellular phone 1 determined based only on the CDMA base station information, can be quickly received and displayed. Furthermore, the position measurement result, which indicates the current position of the cellular phone 1 determined based on both the GPS satellite information and the CDMA base station information, and the position measurement result, which indicates the current position of the cellular phone 1 determined based only on the CDMA base station information, can be simultaneously displayed. This allows easy comparison of these two positions.

The present invention is not limited to the above embodiment. The embodiment can be modified as follows.

The wireless communications terminal is not limited to the cellular phone and can be any other communications terminal, such as a personal digital assistant (PDA).

In the above embodiment, the cellular phone compares the uncertainty information, which is received from the location information server, with the first or second threshold value. However, this can be modified such that the location information server compares the uncertainty information with the first or second threshold value. In such a case, when the location information server determines that the value indicated by the uncertainty information is greater than the first or second threshold value, the other position measurement result can be transmitted from the location information server to the cellular phone.

Furthermore, by providing a learning capability in the cellular phone, the best value of the first and/or second threshold value can be automatically determined.

The above arrangement can be modified such that the above operation can be performed only when a predetermined operational mode is selected as an operational mode of the cellular phone.

The above arrangement can be also modified such that the value indicated by the uncertainty information, i.e., the error (distance) of the position measurement result is displayed along with the position measurement result. The above arrangement can be also modified such that when a plurality of position measurement results is received from the location information server, the position measurement result having the minimum error is displayed on the screen of the display device 14, or alternatively the position measurement results are displayed sequentially starting from the position measurement result having the minimum error in ascending order. Furthermore, if the display device 14 of the cellular phone 1 is a color display device, the position measurement results can be displayed with different colors.

The above arrangement can be further modified such that when the user performs a predetermined corresponding operation while the position measurement result is displayed, the other position measurement result is received from the location information server.

The condition for determination of the position of the cellular phone 1 is specified to achieve the following operation. That is, when the value indicated by the uncertainty information is greater than the first threshold value, and thus the transmission of the position measurement result is requested to the location information server 6 once again, the cellular phone 1 obtains the CDMA base station information once again by performing another search for the CDMA base stations and transmits the obtained CDMA base station information to the location information server 6, so that the location information server 6 determines the position of the cellular phone 1 based only on the CDMA base station information.

The computer program executed by the CPU 2 of the cellular phone 1 is not necessarily stored in the storage initially, for example, at the manufacturing stage of the cellular phone 1. For example, the computer program can be downloaded to the cellular phone 1 from a predetermined server through a telephone network. Alternatively, the computer program can be initially stored in a recording medium, such as a compact disk-read only memory (CD-ROM) or a card, and the computer program may be installed to the storage of the cellular phone 1 from the recording medium.

Additional advantages and modifications will readily occur to those skilled in the art. The invention in its broader terms is therefore, not limited to the specific details, representative apparatus, and illustrative examples shown and described.

What is claimed is:

1. A wireless communications terminal comprising:
    a plurality of searching means, each for searching at least one corresponding external signal source, which outputs a signal usable in determining a position of the wireless communications terminal, and for outputting search information about the at least one corresponding external signal source, which is obtained through the searching of the at least one corresponding external signal source, wherein the plurality of searching means includes:
        a first searching means for searching at least one GPS satellite as the at least one corresponding external signal source; and
        a second searching means for searching at least one base station as the at least one corresponding external signal source;
    a wireless telephone transceiver means for performing wireless telephone communication with a corresponding one of the at least one base station;
    an outputting means for outputting positional information of the wireless communications system; and
    a control means for controlling the plurality of searching means, the wireless telephone transceiver means and the outputting means, wherein:
        the control means receives each search information from each searching means and transmits each search information to an external location information server through the wireless telephone transceiver means, wherein the external location information server is capable of generating a plurality of position measurement results, each of which indicates the position of the wireless communications terminal, based on the search information of at least one of the plurality of searching means and is also capable of transmitting each of the position measurement results;
        the control means receives a first one of the position measurement results, which is transmitted from the external location information server, through the wireless telephone transceiver means and determines whether a predetermined condition is satisfied; and
        when the control means determines that the predetermined condition is satisfied, the control means receives a second one of the position measurement results, which is transmitted from the external location information server, through the wireless telephone transceiver means and outputs the second one of the position measurement results to the outputting means, so that the outputting means outputs the second one of the position measurement results as the positional information of the wireless communications terminal.

2. A wireless communications terminal according to claim 1, wherein the control means receives the second one of the position measurement results, which is transmitted from the external location information server, through the wireless telephone transceiver means without actuating the plurality of searching means when the control means determines that the predetermined condition is satisfied.

3. A wireless communications terminal according to claim 1, wherein:
    the external location information server is further capable of generating and transmitting uncertainty information of each of the position measurement results, wherein the uncertainty information of each of the position measurement results indicates an uncertainty level of each of the position measurement results;
    the control means receives the uncertainty information of the first one of the position measurement results through the wireless telephone transceiver means and determines whether the uncertainty level indicated by the uncertainty information of the first one of the position measurement results is greater than a predetermined first threshold value; and
    when the control means determines that the uncertainty level indicated by the uncertainty information of the first one of the position measurement results is greater than the predetermined first threshold value, the control means determines that the predetermined condition is satisfied.

4. A wireless communications terminal according to claim 3, further comprising an operating means for allowing a user to operate the wireless communications terminal, wherein the control means sets the predetermined first threshold value when the user performs a predetermined first operation through the operating means.

5. A wireless communications terminal according to claim 1, further comprising an operating means for allowing an user to operate the wireless communications terminal, wherein the control means determines that the predetermined condition is satisfied when the user performs a predetermined second operation through the operating means.

6. A wireless communications terminal according to claim 1, wherein the control means simultaneously outputs both the first one and second one of the position measurement results to the outputting means, so that the outputting means outputs both the first one and second one of the position measurement results as the positional information of the wireless communications terminal.

7. A wireless communications terminal according to claim 1, wherein:
   the external location information server is further capable of generating and transmitting uncertainty information of each of the position measurement results, wherein the uncertainty information of each of the position measurement results indicates an uncertainty level of each of the position measurement results;
   the first one of the position measurement results is generated based on both the search information of the first searching means for searching the at least one GPS satellite and the search information of the second searching means for searching the at least one base station;
   the second one of the position measurement results is generated based only on the search information of the second searching means for searching the at least one base station;
   when the control means determines that the uncertainty level indicated by the uncertainty information of the second one of the position measurement results is greater than a predetermined second threshold value, the control means outputs a position of the corresponding one of the at least one base station, which currently communicates with the wireless communications terminal, to the outputting means, so that the outputting means outputs the position of the corresponding one of the at least one base station, which currently communicates with the wireless communications terminal, as the position information of the wireless communications terminal.

8. A wireless communications terminal according to claim 1, wherein:
   the outputting means includes a display device;
   the first one of the position measurement results is generated based on both the search information of the first searching means for searching the at least one GPS satellite and the search information of the second searching means for searching the at least one base station;
   the second one of the position measurement results is generated based only on one of:
      the search information of the first searching means for searching the at least one GPS satellite; and
      the search information of the second searching means for searching the at least one base station;
   when the control means determines that the predetermined condition is not satisfied, the control means commands the display device to display the first one of the position measurement results together with a first source indication, which indicates that the first one of the position measurement results is generated based on both the search information of the first searching means for searching the at least one GPS satellite and the search information of the second searching means for searching the at least one base station; and
   when the control means determines that the predetermined condition is satisfied, the control means commands the display device to display the second one of the position measurement results together with a second source indication, which indicates that the second one of the position measurement results is generated based only on the corresponding one of the search information of the first searching means for searching the at least one GPS satellite and the search information of the second searching means for searching the at least one base station.

9. A wireless communications terminal according to claim 8, wherein:
   the external location information server is further capable of generating and transmitting uncertainty information of each of the position measurement results, wherein the uncertainty information of each of the position measurement results indicates an uncertainty level of each of the position measurement results;
   the control means receives the uncertainty information of the first one of the position measurement results through the wireless telephone transceiver means and determines whether the uncertainty level indicated by the uncertainty information of the first one of the position measurement results is greater than a predetermined first threshold value;
   when the control means determines that the uncertainty level indicated by the uncertainty information of the first one of the position measurement results is greater than the predetermined first threshold value, the control means determines that the predetermined condition is satisfied;
   the control means receives the uncertainty information of the second one of the position measurement results through the wireless telephone transceiver means and determines whether the uncertainty level indicated by the uncertainty information of the second one of the position measurement results is greater than a predetermined second threshold value before the control means commands the display device to display the second one of the position measurement results together with the second source indication;
   when the control means determines that the uncertainty level indicated by the uncertainty information of the second one of the position measurement results is not greater than the predetermined second threshold value, the control means commands the display device to display the second one of the position measurement results together with the second source indication;
   when the control means determines that the uncertainty level indicated by the uncertainty information of the second one of the position measurement results is greater than the predetermined second threshold value, the control means commands the display device to display a position of the corresponding one of the at least one base station, which currently communicates with the wireless communications terminal, together with a third source indication, which indicates that the position of the corresponding one of the at least one base station, which currently communicates with the wireless communications terminal, is displayed on the display device.

10. A wireless communications terminal according to claim 9, wherein:
   the second one of the position measurement results is generated based only on the search information of the second searching means for searching the at least one base station;
   the second source indication indicates that the second one of the position measurement results is generated based only on the search information of the second searching means for searching the at least one base station;
   when the control means determines that the uncertainty level indicated by the uncertainty information of the second one of the position measurement results is greater than the predetermined second threshold value, the control means commands the display device to display all of:

the first one of the position measurement results together with the first source indication;

the second one of the position measurement results together with the second source indication; and the position of the corresponding one of the at least one base station, which currently communicates with the wireless communications terminal, together with the third source indication.

11. A wireless communications terminal according to claim 10, wherein when the control means determines that the uncertainty level indicated by the uncertainty information of the second one of the position measurement results is greater than the predetermined second threshold value, the control means receives a third one of the position measurement results, which is generated by the external location information server based only on the search information of the first searching means for searching the at least one GPS satellite, and commands the display device to further display the third one of the position measurement results together with a fourth indication, which indicates that the third one of the position measurement results is generated based only on the search information of the first searching means for searching the at least one GPS satellite.

12. A wireless communications terminal according to claim 8, wherein when the control means determines that the predetermined condition is satisfied, the control means commands the display device to display the first one of the position measurement results together with the first source indication in addition to the second one of the position measurement results together with the second source indication.

13. A wireless communications terminal according to claim 8, wherein when the control means determines that the predetermined condition is satisfied, the control means commands the display device to display the second one of the position measurement results together with the second source indication without displaying the first one of the position measurement results and the first source indication.

14. A wireless communications terminal according to claim 8, wherein:

the display device is capable of displaying a mode selection screen, through which a user manually selects one of a plurality of display modes; and selection of each of the display modes causes display of a corresponding one of the position measurement results on the display device.

15. A computer program executable by a wireless communications terminal, the computer program comprising instructions for:

receiving search information from each of a plurality of searching means, each for searching at least one corresponding external signal source, which outputs a signal usable in determining a position of the wireless communications terminal, and for outputting the search information about the at least one corresponding external signal source, which is obtained through the searching of the at least one corresponding external signal source, wherein the plurality of searching means includes a first searching means for searching at least one GPS satellite as the at least one corresponding external signal source and a second searching means for searching at least one base station as the at least one corresponding external signal source;

transmitting the search information of each of the plurality of searching means to an external location information server through a wireless telephone transceiver means for performing wireless telephone communication with a corresponding one of the at least one base station;

receiving a first one of a plurality of position measurement results, each of which indicates the position of the wireless communications terminal, from the external location information server through the wireless telephone transceiver means, wherein the position measurement results are generated by the external location information server based on the search information of at least one of the plurality of searching means;

determining whether a predetermined condition is satisfied;

receiving a second one of the position measurement results from the external location information server through the wireless telephone transceiver means when it is determined that the predetermined condition is satisfied; and inputting the second one of the position measurement results to an outputting means for outputting positional information of the wireless communications system, so that the outputting means outputs the second one of the position measurement results as the positional information of the wireless communications terminal.

16. A method for outputting positional information from a wireless communications terminal, the method comprising:

receiving search information from each of a plurality of searching means, each for searching at least one corresponding external signal source, which outputs a signal usable in determining a position of the wireless communications terminal, and for outputting the search information about the at least one corresponding external signal source, which is obtained through the searching of the at least one corresponding external signal source, wherein the plurality of searching means includes a first searching means for searching at least one GPS satellite as the at least one corresponding external signal source and a second searching means for searching at least one base station as the at least one corresponding external signal source;

transmitting the search information of each of the plurality of searching means to an external location information server through a wireless telephone transceiver means for performing wireless telephone communication with a corresponding one of the at least one base station;

receiving a first one of a plurality of position measurement results, each of which indicates the position of the wireless communications terminal, from the external location information server through the wireless telephone transceiver means, wherein the position measurement results are generated by the external location information server based on the search information of at least one of the plurality of searching means;

determining whether a predetermined condition is satisfied;

receiving a second one of the position measurement results from the external location information server through the wireless telephone transceiver means when it is determined that the predetermined condition is satisfied; and inputting the second one of the position measurement results to an outputting means for outputting positional information of the wireless communications system, so that the outputting means outputs the second one of the position measurement results as the positional information of the wireless communications terminal.

* * * * *